US011372316B2

(12) United States Patent
Togawa et al.

(10) Patent No.: US 11,372,316 B2
(45) Date of Patent: Jun. 28, 2022

(54) LENS BARREL, CAMERA BODY, CAMERA SYSTEM

(71) Applicant: NIKON CORPORATION, Tokyo (JP)

(72) Inventors: Hisanori Togawa, Tokyo (JP); Takumi Nakano, Tokyo (JP); Hiroki Takita, Tokyo (JP); Marie Shimoyama, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 139 days.

(21) Appl. No.: 16/609,108

(22) PCT Filed: Apr. 26, 2017

(86) PCT No.: PCT/JP2017/016641
§ 371 (c)(1),
(2) Date: Oct. 28, 2019

(87) PCT Pub. No.: WO2018/198258
PCT Pub. Date: Nov. 1, 2018

(65) Prior Publication Data
US 2021/0103204 A1    Apr. 8, 2021

(51) Int. Cl.
*G03B 17/14*    (2021.01)
*G02B 27/64*    (2006.01)

(52) U.S. Cl.
CPC ........... *G03B 17/14* (2013.01); *G02B 27/646* (2013.01)

(58) Field of Classification Search
CPC ........ G03B 17/00; G03B 17/02; G03B 17/12; G03B 17/14; G03B 2205/0007;
(Continued)

(56) References Cited

U.S. PATENT DOCUMENTS

| 4,864,348 A * | 9/1989 | Fujiwara ................ G03B 17/00 396/542 |
| 2013/0176629 A1* | 7/2013 | Nakayama ......... H04N 5/23258 359/696 |

(Continued)

FOREIGN PATENT DOCUMENTS

| CN | 108431688 A | 8/2018 |
| CN | 110573961 A | 12/2019 |

(Continued)

OTHER PUBLICATIONS

Aug. 1, 2017 International Search Report issued in International Patent Application No. PCT/JP2017/016641.

(Continued)

*Primary Examiner* — Clayton E. LaBalle
*Assistant Examiner* — Fang-Chi Chang
(74) *Attorney, Agent, or Firm* — Oliff PLC (57) ABSTRACT

A camera system and a lens barrel are provided in an exchangeable-lens camera including a shake correction mechanism that integrally drives a lens barrel and an imaging unit, it being possible for lenses to be exchanged smoothly, and greater utility and convenience to be obtained. A lens barrel to and from which a camera body can be attached and detached, wherein the lens barrel includes: a first barrel having a first engagement part that engages with a first part of the camera body; a second barrel disposed inside the first barrel, the second barrel having a second engagement part that engages with a second part of the camera body, and having an optical system; and a drive unit that drives the second barrel in relation to the first barrel.

11 Claims, 5 Drawing Sheets

(58) Field of Classification Search
CPC .... G03B 2205/0015; G03B 2205/0023; G03B 2205/0038; G03B 2205/0053; G03B 2205/0084; G03B 2205/0069; G02B 27/0025; G02B 27/0068; G02B 27/0075; G02B 27/62; G02B 27/64; G02B 27/644; G02B 7/022; G02B 7/023; G02B 27/646; H04N 5/23248; H04N 5/23251; H04N 5/23258; H04N 5/23261; H04N 5/23264; H04N 5/2328; H04N 5/23287
See application file for complete search history.

(56) References Cited

U.S. PATENT DOCUMENTS

| | | | |
|---|---|---|---|
| 2013/0223828 A1* | 8/2013 | Enomoto | G03B 17/08 396/27 |
| 2015/0195458 A1* | 7/2015 | Nakayama | H04N 5/23258 348/208.11 |
| 2018/0307004 A1 | 10/2018 | Nagaoka et al. | |
| 2020/0096783 A1 | 3/2020 | Togawa et al. | |

FOREIGN PATENT DOCUMENTS

| | | |
|---|---|---|
| JP | S63-276373 A | 11/1988 |
| JP | H06-294994 A | 10/1994 |
| JP | 2010-287952 A | 12/2010 |
| JP | 2013-140285 A | 7/2013 |
| JP | 2015-034904 A | 2/2015 |
| JP | 2015-121755 A | 7/2015 |
| WO | 2017/069283 A1 | 4/2017 |

OTHER PUBLICATIONS

May 11, 2021 Office Action issued in Japanese Patent Application No. 2019-514977.

May 27, 2021 Office Action issued in Chinese Patent Application No. 201780090041.6.

\* cited by examiner

LENS BARREL, CAMERA BODY, CAMERA SYSTEM

TECHNICAL FIELD

The present invention relates to a lens barrel, a camera body and a camera system.

BACKGROUND ART

Conventionally, in an image capturing device that can shoot moving images, in order to correct a wide range shake correction angle, a shake correction mechanism is present in which a lens barrel integral with an image capturing unit is provided so as to be able to swing with respect to the outer frame of the image capturing device, and which includes two drive units having a support shaft orthogonal to an optical axis (see patent document 1).

On the other hand, in an interchangeable lens camera, when a lens is changed, it is necessary that a lens barrel can be attached and detached with respect to a camera body.

Patent Document 1: Japanese Unexamined Patent Application, Publication No. 2013-140285

DISCLOSURE OF THE INVENTION

A lens barrel of the present invention is a lens barrel with respect to which a camera body can be attached and detached, and includes: a first barrel which includes a first engagement unit that engages with a first portion of the camera body; a second barrel that is arranged inside the first barrel and which includes a second engagement unit that engages with a second portion of the camera body includes an optical system; and a drive unit which drives the second barrel with respect to the first barrel. A lens barrel of the present invention is a lens barrel with respect to which a camera body can be attached and detached, and includes: a first barrel; a second barrel which is arranged inside the first barrel and which includes an optical system; and a drive unit which drives the second barrel with respect to the first barrel in a direction of rotation about an axis that is different from an optical axis of the optical system. A camera body of the present invention is a camera body with respect to which a lens barrel including an optical system can be attached and detached, and includes: a first housing which includes a first engagement unit that engages with a first barrel of the lens barrel; and a second housing that is arranged inside the first housing and which includes a second engagement unit that engages with a second barrel of the lens barrel and includes an image capturing element, and the second housing is driven in a direction of rotation about an axis which is different from an optical axis of the optical system. A camera system of the present invention is a camera system with respect to which a camera body and a lens barrel can be attached and detached, the camera body includes: a first housing; and a second housing which includes an image capturing element and the lens barrel includes: a first barrel which engages with the first housing; a second barrel which includes an optical system and which engages with the second housing; and a drive unit which drives the second housing and the second barrel with respect to the first housing or the first barrel.

PREFERRED MODE FOR CARRYING OUT THE INVENTION

A description will be given below with reference to drawings and the like. In the following description, for ease of understanding, as necessary, terms such as a pitch axis P, a yaw axis Y and a roll axis R are used. In embodiments, the pitch axis P is an axis which extends in a left/right direction as seen from a shooter in a position (hereinafter referred to as the normal position) of a camera body 2 in a case where the shooter shoots a horizontally long image with an optical axis set horizontal when a lens barrel 3 is fitted to the camera body 2. The yaw axis Y is an axis which extends in an up/down direction in the normal position. The roll axis R is an axis which extends in the direction of the optical axis in the normal position. Hence, the pitch axis P, the yaw axis Y and the roll axis R are orthogonal to each other. The "orthogonal" includes not only exactly 90 degrees but also a range which is slightly displaced from 90 degrees due to a manufacturing error or an assembly error. It is assumed that rotation about the pitch axis P is pitching, that rotation about the yaw axis Y is yawing and that rotation about the roll axis R is rolling. Furthermore, it is assumed that the direction of the pitching is a pitch direction, that the direction of the yawing is a yaw direction and that the direction of the rolling is a roll direction. A direction along the pitch axis P or a direction along the yaw axis Y is assumed to be a shift direction.

First Embodiment

Figure 1A:
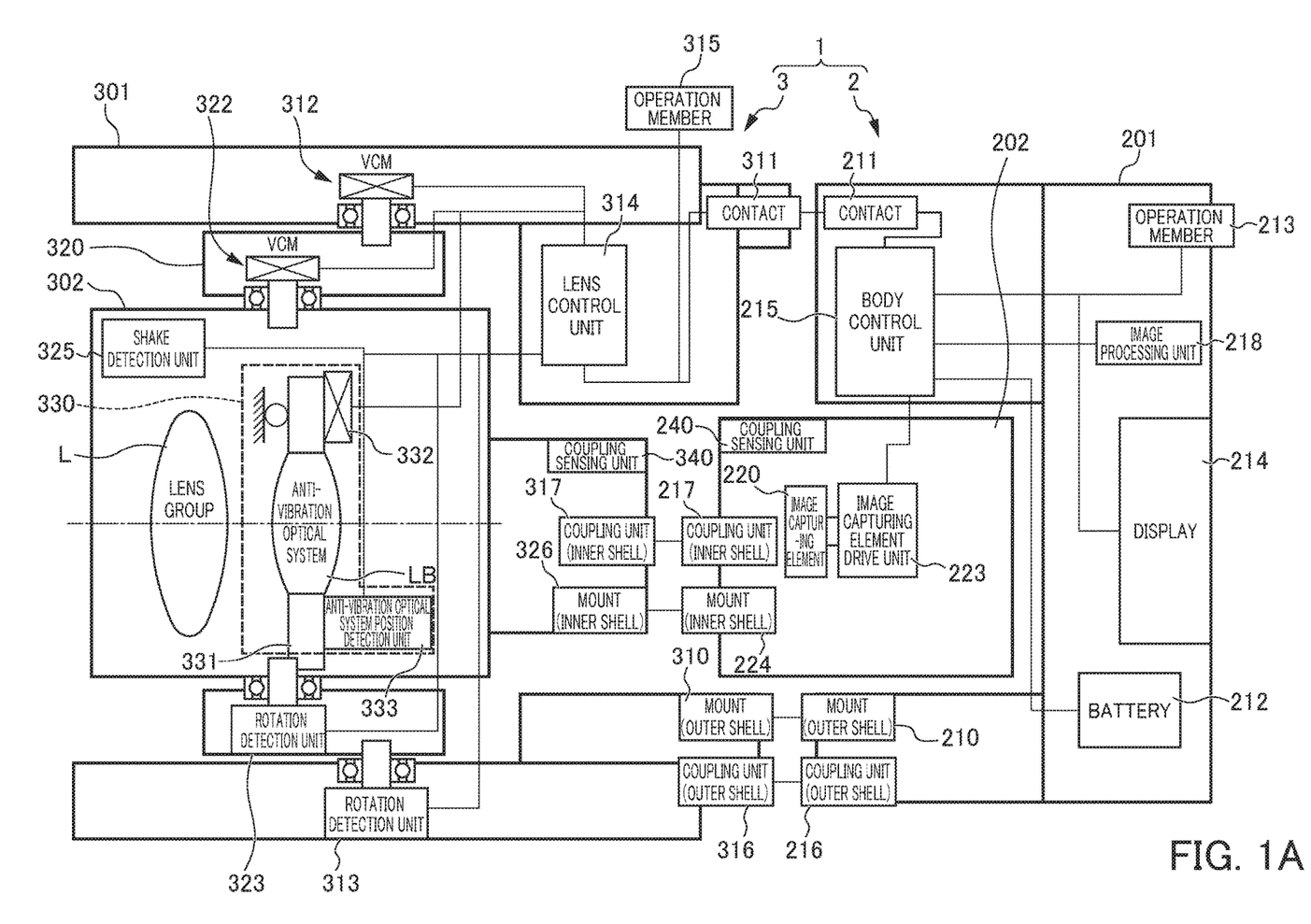
FIG. 1A is a system configuration diagram of a camera system 1 which includes the lens barrel 3 of a first embodiment and a camera body 2.
Figure 1B:
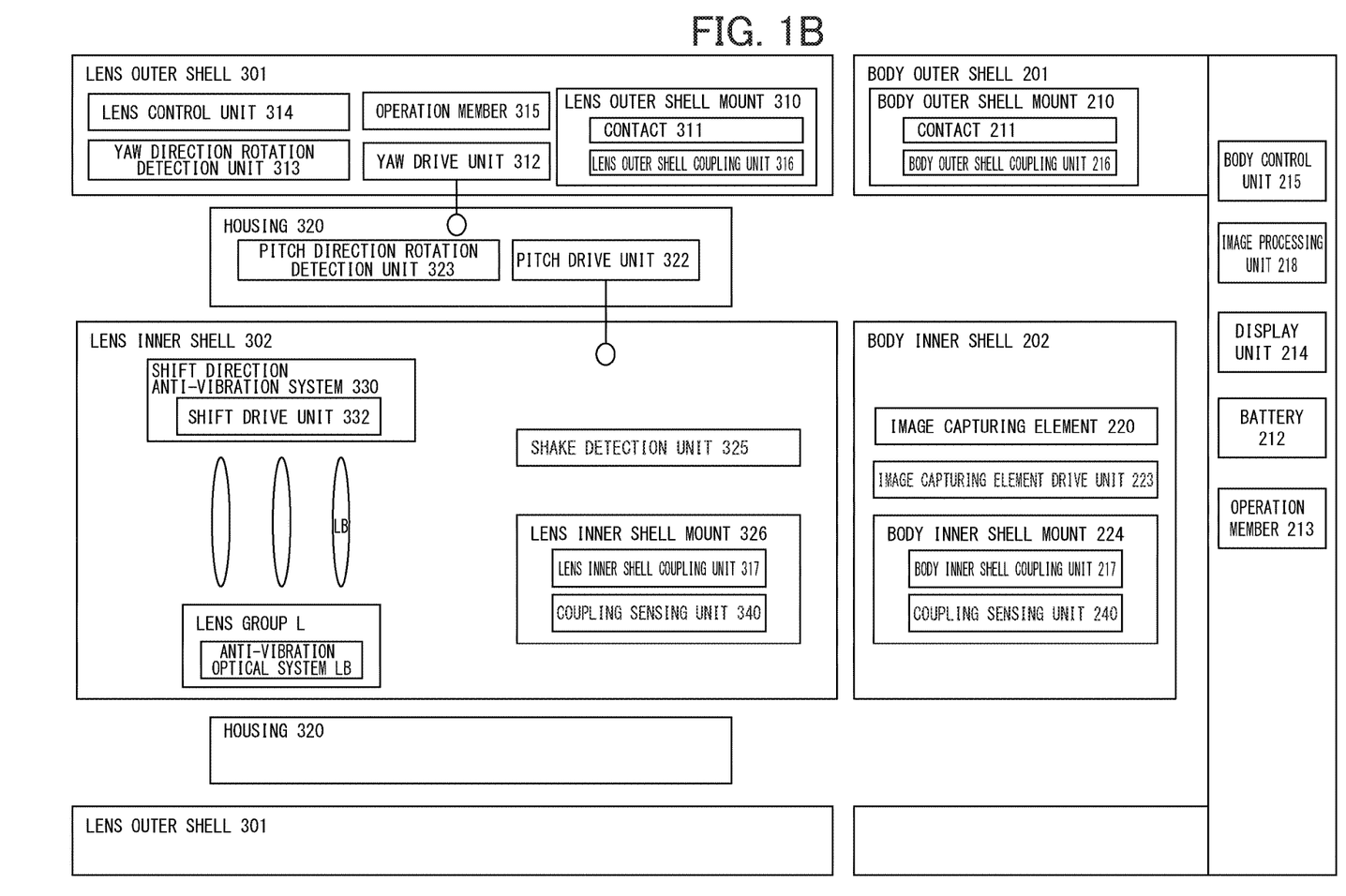
FIG. 1B is a simplified diagram of the system configuration of the camera system 1 which includes the lens barrel 3 of the first embodiment and the camera body 2.

FIG. 1A is a system configuration diagram of a camera system 1 which includes the lens barrel 3 of a first embodiment and the camera body 2. FIG. 1B is a simplified diagram of the system configuration of the camera system 1 which includes the lens barrel 3 of the first embodiment and the camera body 2. Since FIGS. 1A and 1B show the same camera system 1, in these figures, for example, a configuration which is not included in one of the figures is complemented in the other figure, and thus they complement each other. The camera system 1 may be a system which can zoom or may be a system which cannot zoom.

(Lens Barrel 3)

The lens barrel 3 of the present embodiment can be attached and detached with respect to the camera body 2. The lens barrel 3 can be extended and contracted between a reduced barrel state (a non-shot state, a stored state, a retracted state) and an extended state (a shot state). As shown in the system configuration diagrams of FIGS. 1A and 1B, the lens barrel 3 includes: a lens inner shell 302 which holds, therewithin, a lens group L that is an image formation optical system; a housing 320 which is arranged on the outer circumference of the lens inner shell 302; a lens outer shell 301 (for example, a fixed barrel) which is arranged on the outer circumference of the housing 320; and the like. The lens inner shell 302 may be combined with the housing 320 so as to form a lens inner shell.

In the lens barrel 3 of the present embodiment, the lens inner shell 302 can be rotated about the pitch axis P with respect to the housing 320 in the pitch direction. The housing 320 can be rotated about the yaw axis Y with respect to the lens outer shell 301 in the yaw direction.

When the outer shape of the lens barrel 3 as a whole is cylindrical, it is considered that the lens inner shell, the lens outer shell and the housing are also cylindrical. However, for example, in order for other components to be arranged, a flat portion may be provided in an inner circumferential surface or an outer circumferential surface. The shapes of the lens inner shell, the lens outer shell and the housing may be deformed as necessary by formation of a flat portion, a notch, part whose thickness is changed or the like. Instead of the cylindrical shape, a shape such as a quadrangular prism may be adopted.

(Lens Inner Shell 302)

As shown in FIGS. 1A and 1B, the lens inner shell 302 of the lens barrel 3 includes the lens group L, a shift direction anti-vibration system 330, a shake detection unit 325 and a lens inner shell mount 326. The lens inner shell 302 includes part of a pitch drive unit 322 which drives the lens inner shell 302 with respect to the housing 320 in the pitch direction.

The lens group L is the image formation optical system which forms a subject image on an image capturing element 220 arranged in the camera body 2. The lens group L includes an anti-vibration optical system LB. The anti-vibration optical system LB is moved in the shift direction so as to be able to correct image shake caused by hand shake or the like.

The shift direction anti-vibration system 330 is a system which controls the anti-vibration optical system LB that is moved in the shift direction. The shift direction anti-vibration system 330 includes; a movable frame which holds the anti-vibration optical system LB; an anti-vibration optical system position detection unit which detects the position of the anti-vibration optical system LB; a shift drive unit 332 which drives the movable frame in the shift direction; and the like. Examples of the shift drive unit 332 include a voice coil motor (VCM) and the like. With the shift drive unit 332, the anti-vibration optical system LB is driven in such a direction as to cancel out the image shake of the subject image caused by hand shake or the like of the shooter, with the result that the image shake is corrected.

The shake detection unit 325 detects the shake of the lens inner shell 302 in the pitch direction, the yaw direction, the roll direction or the shift direction. The shake detection unit 325 preferably detects shake in at least one direction. The shake detection unit 325 may detect shake in all the directions. Examples of the shake detection unit 325 include a gyro-sensor and the like. The shake detection unit 325 may be formed with one sensor or a plurality of sensors.

The lens inner shell mount 326 has a shape which includes a lens inner shell coupling unit 317, and makes contact with a body inner shell mount 224 which will be described later. The lens inner shell mount 326 includes a coupling sensing unit 340. The coupling sensing unit 340 senses, through a coupling sensing unit 240 which will be described later, the state of coupling (state of engagement) of the lens inner shell 302 and the body inner shell 202.

(Housing 320)

The housing 320 includes the pitch drive unit 322 and a pitch direction rotation detection unit 323. The pitch drive unit 322 drives the lens inner shell 302 in the pitch direction. When the pitch drive unit 322 is driven, the lens inner shell 302 is rotated about the pitch axis P in the pitch direction.

The pitch direction rotation detection unit 323 detects the amount of rotation of the lens inner shell 302 in the pitch direction. In other words, the pitch direction rotation detection unit 323 detects the amount of drive of the pitch drive unit 322. The pitch direction rotation detection unit 323 detects the amount of rotation of the lens inner shell 302 (or the amount of drive of the pitch drive unit 322), and thereby can determine whether or not the lens inner shell 302 (or the pitch drive unit 322) is accurately driven. The housing 320 includes part of a yaw drive unit 312 which drives the housing 320 with respect to the lens outer shell 301 in the yaw direction. When the yaw drive unit 312 is driven, the housing 320 is driven with respect to the lens outer shell 301 in the yaw direction. The lens inner shell 302 is also driven in the yaw direction accordingly.

(Lens Outer Shell 301)

As shown in FIGS. 1A and 1B, the lens outer shell 301 includes the yaw drive unit 312, a yaw direction rotation detection unit 313, an operation member 315, a lens outer shell mount 310 and a lens control unit 314. The yaw drive unit 312 drives the housing 320 in the yaw direction. The yaw direction rotation detection unit 313 detects the rotation of the housing 320 in the yaw direction. In other words, the yaw direction rotation detection unit 313 detects the amount of drive of the yaw drive unit 312. The yaw direction rotation detection unit 313 detects the amount of rotation of the housing 320 (or the amount of drive of the yaw drive unit 312), and thereby can determine whether or not the housing 320 (or the pitch drive unit 322) is accurately driven. The operation member 315 is a member which is operated by a user. The lens outer shell mount 310 includes a contact 311 for communication or energization. The lens outer shell mount 310 has a shape which includes a lens outer shell coupling unit 316. The lens control unit 314 controls the shift drive unit 332, the pitch drive unit 322 and the yaw drive unit 312. When the user operates the operation member 315 which will be described later, the lens control unit 314 moves the lens group L in the direction of the optical axis so as to change a focal length. The lens outer shell 301 and the lens inner shell 302 are electrically connected with a wiring unit such as a flexible printed wiring board (hereinafter, the FPC).

(Camera Body 2)

The camera body 2 will then be described. As shown in the system configuration diagrams of FIGS. 1A and 1B, the camera body 2 includes a body inner shell 202 and a body outer shell 201 (for example, a body fixing unit).

The body inner shell 202 includes the image capturing element 220, an image capturing element drive unit 223 and the body inner shell mount 224. The body outer shell 201 includes a body control unit 215, an image processing unit 218, a body outer shell mount 210, a display unit 214, a battery 212 and an operation member 213.

The image capturing element 220 receives light entering from the image formation optical system (lens group L) and converts it into electrical signals. The image capturing element drive unit 223 drives the image capturing element 220 so as to perform shake correction. The body inner shell mount 224 has a shape which includes a body inner shell coupling unit 217, and makes contact with the lens inner shell mount 326. The body inner shell mount 224 also includes the coupling sensing unit 240. The coupling sensing unit 240 senses, through the coupling sensing unit 340, the state of coupling (state of engagement) of the lens inner shell 302 and the body inner shell 202.

The body control unit 215 performs computation and control on shake correction which will be described later. The body control unit 215 performs various types of control based on an input of the operation member 213 and the like. The image processing unit 218 performs image processing on image data output from the image capturing element 220.

The body outer shell mount 210 includes a contact 211 for communication or energization. The body outer shell mount 210 has a shape which includes a body outer shell coupling unit 216. The display unit 214 displays information on the image data acquired by the image capturing element 220 and various types of settings. The operation member 213 is operated by the user. The body outer shell 201 and the body inner shell 202 are electrically connected with wiring such as an FPC.

In the configuration described above, the camera system 1 of the present embodiment is a camera system which can change the lens barrel 3, and can perform a shake correction operation with the lens inner shell 302 integral with the body inner shell 202 (hereinafter referred to as the "integral drive shake correction". In the camera system 1, the body outer shell 201 of the camera body 2 and the lens outer shell 301 of the lens barrel 3 are coupled to (engaged with) each other so as to be integral with each other. The body inner shell 202 of the camera body 2 and the lens inner shell 302 of the lens barrel 3 are coupled to (engaged with) each other so as to be integral with each other. When in this state, the shake detection unit 325 detects shake in the pitch direction or the yaw direction, the lens control unit 314 drives, based on an output signal thereof, the yaw drive unit 312 and the pitch drive unit 322 in such a direction as to cancel out the shake detected by the shake detection unit 325. Consequently, the shake correction is performed. The image shake of the subject image caused by hand shake or the like of the shooter is corrected. Lens shift shake correction using the shift direction anti-vibration system 330 can be performed simultaneously or selectively. Furthermore, shake correction which is performed by driving, with an unillustrated drive unit, the image capturing element 220 in any one of the shift direction, the pitch direction, the yaw direction and the roll direction may be performed simultaneously or selectively.

(Position in which Shake Detection Unit 325 is Installed)

As described above, the shake detection unit 325 which detects shake necessary for shake correction is provided in the lens inner shell 302. The shake detection unit 325 is provided in the lens inner shell 302, and thus as compared with a case where the shake detection unit 325 is installed on the outer shell side (the body outer shell 201 or the lens outer shell 301), it is possible to accurately detect shake on the inner shell side (the body inner shell 202 or the lens inner shell 302). In the integral drive shake correction, it is necessary to accurately detect shake on the inner shell side. This is because shake on the inner shell side and shake on the outer shell side do not necessarily agree with each other. Targets to be driven in the integral drive shake correction are the body inner shell 202 and the lens inner shell 302, and thus it is necessary to accurately detect shake on the inner shell side. The shake detection unit 325 may be provided in the body inner shell 202, and even in such a case, it is possible to detect shake on the inner shell side. In this case, the result of the detection detected with the shake detection unit 325 can be transmitted to the body control unit 215 without intervention of the contact in the mount or the like. In the integral drive shake correction operation, the body control unit 215 performs the shake correction operation such that the direction of the optical axis is not changed. Control may be performed such that the detection value of the shake detection unit 325 is decreased. Control may also be performed such that the amount of shake of an image capturing surface (the image capturing element 220) is decreased.

A sensor (such as a Hall element or a PSD) which can detect a positional relationship between the outer shell side and the inner shell side may be provided. The positional relationship between the outer shell side and the inner shell side can be detected with the sensor described above, and thus even when the shake detection unit 325 is installed on the outer shell side, it is possible to accurately detect shake on the inner shell side. In other words, the shake detection unit 325 can be installed in the lens outer shell 301 or the body outer shell 201.

The configuration in which the shake detection unit 325 is provided in the body inner shell 202 is also advantageous in that when information on the shake detected with the shake detection unit 325 is transmitted to the body control unit 215, a communication means such as the contact provided in the mount is not needed. In other words, the amount of information transmitted and received between the camera body 2 and the lens barrel 3 can be decreased.

As a position in which the shake detection unit 325 is installed, a place is preferable to which vibrations other than hand shake (such as vibrations caused by the movement of a mirror or a shutter) are not applied. Examples thereof include the top of a hard component, a place which corresponds to a vibration node, the subject side of the lens barrel 3 and the like. A plurality of shake detection units 325 may be provided. In this case, the shake detection units 325 are installed in positions away from each other, and thus it is possible to more specifically and accurately detect the state of shake, with the result that it is possible to perform highly accurate control.

Furthermore, the shake detection units may be provided in a plurality of or all of the body inner shell 202, the lens inner shell 302, the lens outer shell 301 and the body outer shell 201. In this case, a configuration may be adopted in which a plurality of shake detection units provided in a plurality of constituent units are used so as to perform highly accurate control.

(Position in which VCM is Installed)

In the yaw drive unit 312, as described previously, a main configuration such as a coil is installed in the lens outer shell 301 of the lens barrel 3, and thus a load in the shake correction operation can be reduced, with the result that the shake correction operation can be rapidly performed with high responsivity and lower power. In other words, since the main part of the yaw drive unit 312 is installed in the lens outer shell 301, the main part of the yaw drive unit 312 is not included in a target to be driven at the time of the shake correction operation such that the inertia of the target to be driven is reduced accordingly and thus the load in the shake correction operation can be reduced, with the result that the shake correction operation can be rapidly performed with high responsivity and lower power. In the pitch drive unit 322, as described previously, a main configuration such as a coil is installed in the housing 320, and thus the load in the shake correction operation can be reduced, with the result that the shake correction operation can be rapidly performed with high responsivity and lower power. In other words, since the main part of the pitch drive unit 322 is installed in the housing 320, the main part of the pitch drive unit 322 is not included in the target to be driven at the time of the shake correction operation such that the inertia of the target to be driven is reduced accordingly and thus the load in the shake correction operation can be reduced, with the result that the shake correction operation can be rapidly performed with high responsivity and lower power.

The shake correction operation will then be described with reference to FIGS. 2 and 3. In the flowcharts shown in FIGS. 2 and 3, it is possible to perform three types of shake correction below.
(1) Integral drive shake correction: shake correction which is performed by integrally driving the lens inner shell 302 and the body inner shell 202
(2) Lens shake correction:
shake correction which is performed in the shift direction anti-vibration system 330
The anti-vibration optical system LB is driven in the shift direction, and thus the image shake is corrected.
(3) Image capturing element shake correction: shake correction which is performed by moving the image capturing element 220 Which types of them are combined so as to be performed is not limited to the flowcharts shown in FIGS. 2 and 3, and may be changed according to the selection of the user or may be automatically changed according to the conditions of shooting. For example, the integral drive shake correction, the lens shake correction and the image capturing element shake correction may be automatically switched according to the frequency of the vibration of the shake detected with the shake detection unit 325. For example, it is considered that the lens shake correction or the image capturing element shake correction is performed on shake in which the frequency of the vibration is relatively low and that the integral drive shake correction is applied to shake in which the frequency of the vibration is relatively high. The individual types of shake correction may be combined as necessary so as to be performed.

The shake correction operation will be described in detail for each of an operation on the side of the camera body 2 and an operation on the side of the lens barrel 3.
(Operation on the Side of Camera Body 2)

Figure 2:
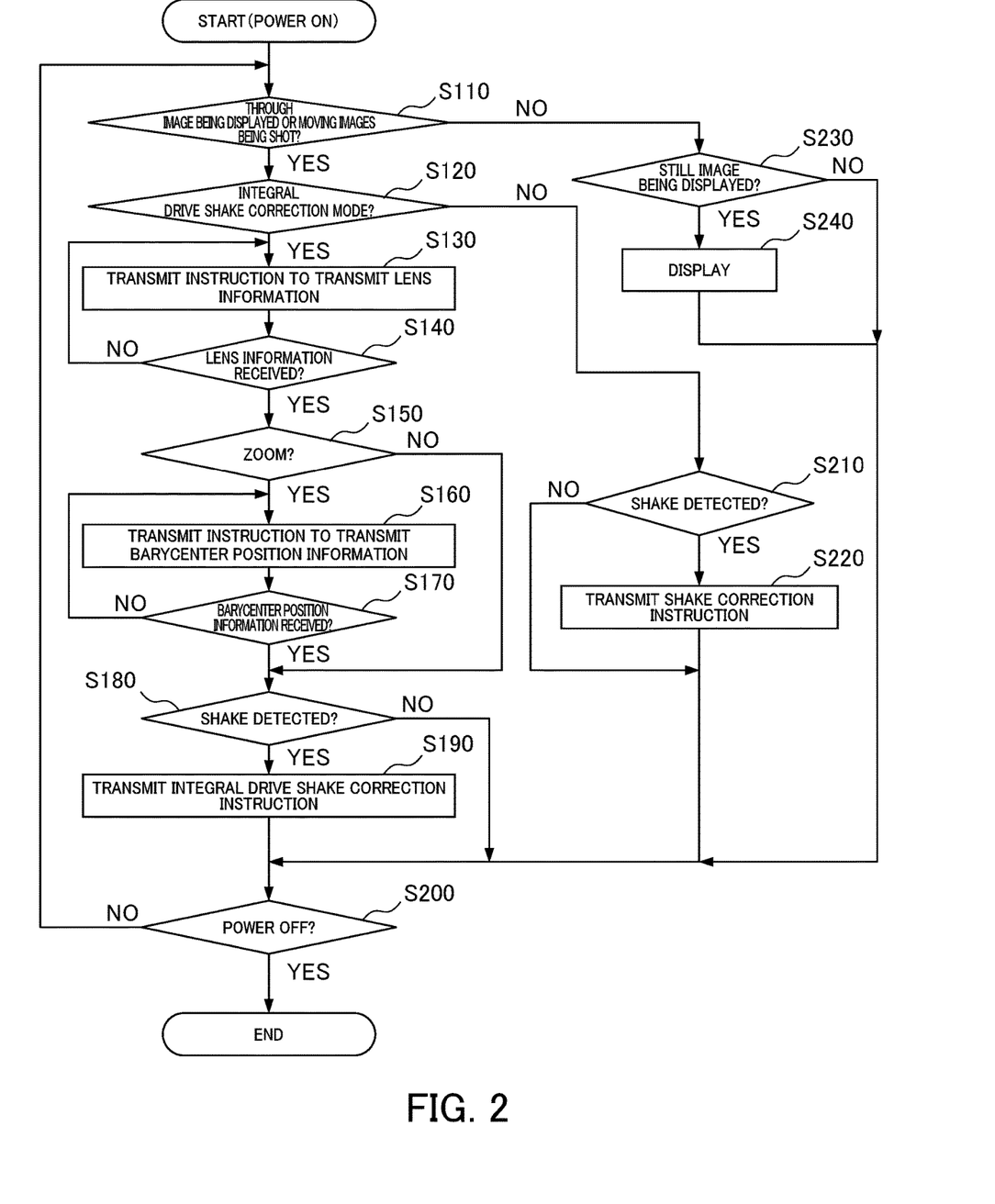
FIG. 2 is a flowchart showing a process which is performed by a body control unit 215.

FIG. 2 is the flowchart showing a process which is performed by the body control unit 215. When the power of the camera body 2 is turned on, and thus an operation is started, in step (hereinafter referred to as S) 110, the body control unit 215 determines whether a through image is being displayed or moving images are being shot. When a through image is being displayed or moving images are being shot, the process proceeds to S120. When a through image is not being displayed and moving images are not being shot, the process proceeds to S230.

In S120, the body control unit 215 determines whether or not the current shake correction mode is an integral drive shake correction mode. The body control unit 215 determines, for example, based on the mode set by the user, the mode of the shake correction. As described above, based on the shake detected with the shake detection unit 325, the body control unit 215 may automatically determine the mode of the shake correction. When in the system, each of the camera body 2 and the lens barrel 3 includes an inner shell, it may be determined that the mode of the shake correction is the integral drive shake correction mode whereas when in the system, at least one of them does not include an inner shell, it may be determined that the mode of the shake correction is the lens shake correction mode or the image capturing element shake correction mode. When the operational mode is the integral drive shake correction mode, the process proceeds to S130 whereas when the operational mode is the mode other than the integral drive shake correction mode, the process proceeds to S210.

In S130, the body control unit 215 transmits an instruction to transmit lens information to the lens control unit 314 of the lens barrel 3 fitted to the camera body 2. Here, the lens information refers to information which is mainly necessary for the integral drive shake correction in the information on the lens barrel 3. Examples thereof include information on the position in which the pitch drive unit 322 or the yaw drive unit 312 is installed (such as a distance from the mount position of the lens barrel 3, on which of the inner shell side and the outer shell side the pitch drive unit 322 or the yaw drive unit 312 is installed), information on the barycenter position of the lens barrel 3 or the barycenter position of the lens inner shell 302 and the like. Examples thereof may include information on the drive characteristics of the pitch drive unit 322 or the yaw drive unit 312 (response characteristics of the combination of the pitch drive unit 322 or the yaw drive unit 312 and the lens inner shell 302), information on the focal length of the lens including whether the lens is a single focus lens or a zoom lens, information on the current focal length and information on the current barycenter position when the lens is a zoom lens and the like. The barycenter position may be the barycenter position of the optical system.

In S140, the body control unit 215 determines whether or not the lens information requested in S130 is received from the lens barrel 3. When the lens information is not received, the process returns to S130, and the instruction (request) to transmit the lens information is repeated. When the lens information is received, the process proceeds to S150.

In S150, the body control unit 215 determines whether or not a zoom operation is performed. When the zoom operation is performed, the lens group L is moved, and thus the barycenter position of the lens inner shell 302 (or the lens barrel 3) is changed. Hence, it is necessary to adjust the direction and amount of drive of the pitch drive unit 322 or the yaw drive unit 312 in the integral drive shake correction. When the zoom operation is performed, the process proceeds to S160. When the zoom operation is not performed, the process proceeds to S180.

In S160, the body control unit 215 transmits, to the lens barrel 3, an instruction to transmit barycenter position information after the zoom.

In S170, the body control unit 215 determines whether or not the barycenter position information requested in S160 is received from the lens barrel 3. When the barycenter position information is not received, the process returns to S160, and the instruction (request) to transmit the barycenter position information is repeated. When the barycenter position information is received from the lens barrel 3, the process proceeds to S180.

In S180, the body control unit 215 determines whether or not the shake detection unit 325 detects shake. The shake detected in the shake detection unit 325 is acquired through the contacts 311 and 211 in the body control unit 215 of the camera body 2. The timing with which the body control unit 215 acquires the shake detected in the shake detection unit 325 is not limited to the time of S130. The lens barrel 3 may transmit the shake detected in the shake detection unit 325 to the camera body 2 with predetermined timing. The shake detection unit 325 can detect at least one of shake in the pitch direction, shake in the yaw direction, shake in the roll direction and shake in the shift direction. The shake detection unit 325 may detect shake in all the directions or may detect shake in a plurality of directions. Here, with respect to whether or not the shake detection unit 325 detects shake, for example, when the output value of the shake detection unit 325 is equal to or more than a fixed value, it is determined that the shake detection unit 325 detects shake. When the shake detection unit 325 detects at least one of shake in the pitch direction, shake in the yaw direction, shake in the roll direction and shake in the shift direction, the process proceeds to S190. When the shake detection unit 325 does not detect shake in any of the directions, the process proceeds to S200.

In S190, the body control unit 215 transmits a shake correction instruction to the lens barrel 3. The shake correction instruction provided in S190 is an instruction on the integral drive shake correction. Here, the body control unit 215 computes in which direction the yaw drive unit 312 and the pitch drive unit 322 are driven and how far they are driven. The lens control unit 314 performs, according to instructions from the body control unit 215, drive control on individual actuators (the yaw drive unit 312 and the pitch drive unit 322). In the computation of the integral drive shake correction performed by the body control unit 215, the detection value of the shake detection unit 325, information on a position in which the shake detection unit 325 is installed and the barycenter position information of the lens barrel 3 (or the barycenter position information of the lens inner shell 302) are needed. Information on a position in which the pitch drive unit 322 or the yaw drive unit 312 is installed may be used. The body control unit 215 uses these pieces of information so as to compute parameters for the shake correction instruction necessary for shake correction and transmits them to the lens control unit 314. The computation of the shake correction may be performed by the lens control unit 314.

In S200, the body control unit 215 determines whether or not the power is turned off. When the power is not turned off, the process returns to S110 whereas when the power is turned off, the operation is completed.

In S210, as in S180, the body control unit 215 determines whether or not the shake detection unit 325 detects shake. When the shake detection unit 325 detects shake, the process proceeds to S220 whereas when the shake detection unit 325 does not detect shake, the process proceeds to S200.

In S220, the body control unit 215 transmits the shake correction instruction to the lens barrel 3. When in S120, it is determined that the current shake correction mode is the lens shake correction, the body control unit 215 transmits an instruction on the lens shake correction to the lens barrel 3. When the lens barrel 3 receives the instruction on the lens shake correction, the lens barrel 3 operates the shift direction anti-vibration system 330 and thereby drives the anti-vibration optical system so as to perform the shake correction. When in S120, it is determined that the current shake correction mode is the image capturing element shake correction, the body control unit 215 drives an image capturing element drive unit X so as to perform the image capturing element shake correction. In this case, the body control unit 215 does not need to transmit the shake correction instruction to the lens barrel 3. Thereafter, the process proceeds to S200.

In S230, the body control unit 215 determines whether or not a still image is being displayed. When a still image is being displayed, the process proceeds to S240. When a still image is not being displayed, the process proceeds to S200.

(Operation on the Side of Lens Barrel 3)

Figure 3:
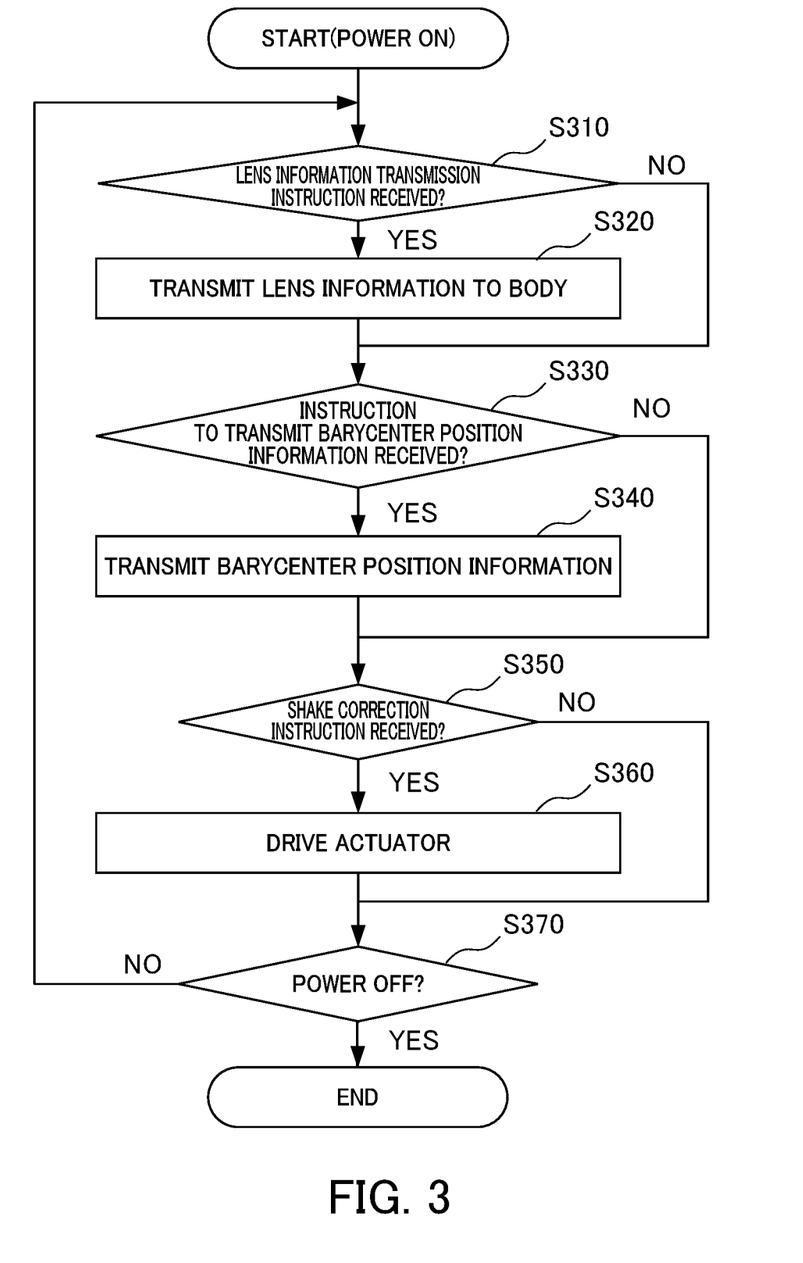
FIG. 3 is a flowchart showing the flow of an integral drive shake correction operation which is performed by the lens barrel 3.

FIG. 3 is the flowchart showing the flow of the integral drive shake correction operation which is performed by the lens barrel 3. In S310, the lens control unit 314 determines whether or not the lens information transmission instruction is received from the camera body 2. When the lens information transmission instruction is received, the process proceeds to S320 whereas when the lens information transmission instruction is not received, the process proceeds to S330. The operation in S310 is an operation which corresponds to S130 in FIG. 2.

In S320, the lens control unit 314 transmits the lens information requested from the camera body 2 to the camera body 2. As described previously, the lens information to be transmitted here is information which is mainly necessary for the integral drive shake correction in the information on the lens barrel 3. Examples thereof include information on the position in which the pitch drive unit 322 or the yaw drive unit 312 is installed (such as a distance from the mount position of the lens barrel 3, on which of the inner shell side and the outer shell side the pitch drive unit 322 or the yaw drive unit 312 is installed), information on the barycenter position of the lens barrel 3 or the barycenter position of the lens inner shell 302 and the like. Examples thereof may include information on the drive characteristics of the pitch drive unit 322 or the yaw drive unit 312 (response characteristics of the combination of the pitch drive unit 322 or the yaw drive unit 312 and the lens inner shell 302), information on the focal length of the lens including whether the lens is a single focus lens or a zoom lens, information on the current focal length and information on the current barycenter position when the lens is a zoom lens and the like.

In S330, the lens control unit 314 determines whether or not the instruction to transmit the barycenter position information is received from the camera body 2. When the barycenter position information transmission instruction is received, the process proceeds to S340 whereas when the barycenter position information transmission instruction is not received, the process proceeds to S350. The operation in S330 is an operation which corresponds to S160 in FIG. 2.

In S340, the lens control unit 314 transmits the barycenter position information to the camera body 2. The barycenter position information transmitted in S340 is the information of the barycenter position which is changed by performing the zoom operation, that is, the information of the barycenter position at the time of transmission. Here, the lens control unit 314 may have a barycenter information table in which a relationship between the focal length and the barycenter position is stored. The lens control unit 314 references the barycenter information table so as to transmit, to the camera body 2, the information of the barycenter position corresponding to the focal length at that time.

In S350, the lens control unit 314 determines whether or not the shake correction instruction is received from the camera body 2. When the shake correction instruction is received, the process proceeds to S360 whereas when the shake correction instruction is not received, the process proceeds to S370.

In S360, the lens control unit 314 drives the actuator, that is, any one or a plurality of the yaw drive unit 312, the pitch drive unit 322 and the shift drive unit 332 so as to perform the shake correction. When the shake correction instruction is transmitted in S190 of FIG. 2, the lens control unit 314 drives the yaw drive unit 312 and the pitch drive unit 322. When the shake correction instruction is transmitted in S220 of FIG. 2, the lens control unit 314 drives the shift drive unit 332. Here, the lens control unit 314 controls the operations of the individual actuators according to the direction and amount of drive indicated from the body control unit 215.

In S370, the lens control unit 314 determines whether or not the power is turned off. When the power is not turned off, the process returns to S310 whereas when the power is turned off, the operation is completed.

As described above, in an interchangeable lens camera which includes a shake correction mechanism for integrally driving a lens barrel and an image capturing unit, lenses can be changed smoothly, and thus practicality and convenience can be enhanced.

Second Embodiment

Figure 4:
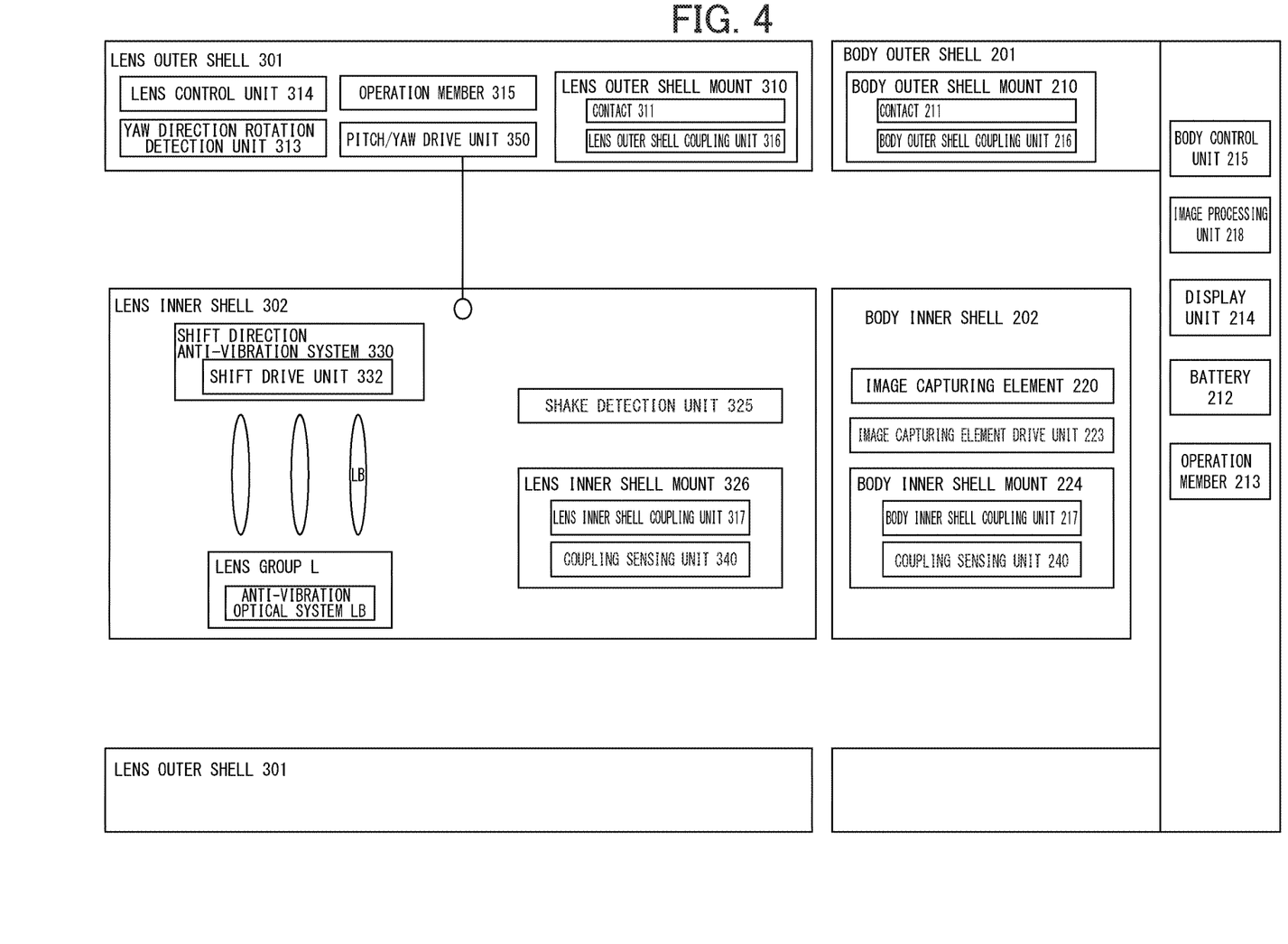
FIG. 4 is a system configuration diagram of a camera system 1 which includes the lens barrel 3 of a second embodiment and a camera body 2.

FIG. 4 is a system configuration diagram of a camera system 1 which includes the lens barrel 3 of a second embodiment and a camera body 2. In the second embodiment, the configuration of the lens barrel 3 differs from that in the first embodiment. Specifically, the lens barrel 3 of the second embodiment includes a pitch/yaw drive unit 350 instead of the yaw drive unit 312 and the pitch drive unit 322 in the first embodiment. The pitch/yaw drive unit 350 is a multi-axis drive type actuator which is fixed to the lens outer shell 301 and which can drive the lens inner shell 302 both in the pitch direction and the yaw direction. This change is made, and thus the yaw direction rotation detection unit 313 and the pitch direction rotation detection unit 323 are omitted. Instead of the yaw direction rotation detection unit 313 and the pitch direction rotation detection unit 323, for example, a sensor which detects the amount of drive may be provided within the pitch/yaw drive unit 350 or a non-contact sensor or the like may be additionally provided. The other configurations are the same as in the first embodiment, and thus detailed description will be omitted. In the second embodiment, the pitch/yaw drive unit 350 which is an actuator for driving the lens inner shell 302 and the body inner shell 202 is provided in the lens outer shell 301, and thus it is possible to reduce a mass on the lens inner shell side which is driven, with the result that the integral drive shake correction can be driven with lower power. Since wiring to the pitch/yaw drive unit 350 can be completed only on the outer shell side, wiring to the lens inner shell 302 can be reduced.

(Variations)

The present invention is not limited to the embodiments described above, and various variations and modifications are possible.

(1) The description is given using the example where the body control unit 215 computes, on the integral drive shake correction, in which direction the yaw drive unit 312 and the pitch drive unit 322 are driven and how far they are driven and where the lens control unit 314 performs control on the operations of the individual actuators themselves according to the instructions from the body control unit 215. However, what operations each of the control units performs is not limited to the example of the present embodiment, and can be modified as necessary. For example, the lens control unit 314 may perform all shake correction computation on the integral drive shake correction or the body control unit 215 and the lens control unit 314 may perform computation on the shake correction. Which one of the body control unit 215 and the lens control unit 314 performs the computation on the integral drive shake correction may be changed according to the combination of the camera body 2 and the lens barrel 3.

(2) The description is given using the example where the integral drive shake correction, the lens shake correction and the image capturing element shake correction are provided. These types of shake correction may be performed singly or may be combined as necessary so as to be performed.

(3) Although the description is given of the switching of the integral drive shake correction, the lens shake correction and the image capturing element shake correction, there may be a case where the shake correction is not performed.

(4) The embodiments discussed above are described using the example where the lens barrel 3 includes the pitch drive unit 322 and the yaw drive unit 312. However, there is no limitation to this example, and the camera body 2 may include the pitch drive unit 322 or the yaw drive unit 312. Both the drive units may be included in the camera body 2 or one of the drive units may be included in the camera body 2, and the other drive unit may be included in the lens barrel 3.

(5) In the description of the embodiments discussed above, the lens inner shell 302 and the body inner shell 202 are driven in the pitch direction or the yaw direction so as to perform the shake correction. However, there is no limitation to this configuration, and the lens inner shell 302 and the body inner shell 202 may be driven in the shift direction so as to perform the shake correction. In this case, instead of the pitch drive unit 322 and the yaw drive unit 312, a drive unit which can be driven in the shift direction is provided so as to drive the lens inner shell 302 or the housing 320 in the shift direction.

The embodiments and the variations may be arbitrarily combined. The present invention is not limited to the embodiments described above.

EXPLANATION OF REFERENCE NUMERALS 1 camera system
2 camera body
3 lens barrel
201 body outer shell
202 body inner shell
210 body outer shell mount
211 contact
212 battery
213 operation member
214 display unit
215 body control unit
216 body outer shell coupling unit
217 body inner shell coupling unit
218 image processing unit
220 image capturing element
223 image capturing element drive unit
224 body inner shell mount
240 coupling sensing unit
301 lens outer shell
302 lens inner shell
310 lens outer shell mount
311 contact
312 yaw drive unit
313 yaw direction rotation detection unit
314 lens control unit
315 operation member
316 lens outer shell coupling unit
317 lens inner shell coupling unit
320 housing
321 second lens housing
322 pitch drive unit
323 pitch direction rotation detection unit
324 image formation optical system
325 shake detection unit
326 lens inner shell mount
330 shift direction anti-vibration system
332 shift drive unit
340 coupling sensing unit
350 pitch/yaw drive unit

The invention claimed is:

1. A lens barrel with respect to which a camera body can be attached and detached, the lens barrel comprising:
   a first barrel which includes a first mount that can be attached to and detached from a first portion of the camera body;
   a second barrel that (i) is arranged inside the first barrel, (ii) includes a second mount that can be attached to and detached from a second portion of the camera body, and (iii) includes an optical system;
   a detection unit configured to detect a hand shake of a shooter holding at least one of the camera body and the lens barrel; and
   a drive unit that, based on an amount of the hand shake detected by the detection unit, drives the second barrel with respect to the first barrel.

2. The lens barrel according to claim 1, further comprising a communication unit which communicates with the camera body,
   wherein when the communication unit receives an instruction to drive the drive unit from the camera body, the drive unit drives the second barrel with respect to the first barrel.

3. The lens barrel according to claim 2,
   wherein the communication unit transmits the amount of the hand shake detected by the detection unit to the camera body.

4. The lens barrel according to claim 3, wherein the detection unit is included in the second barrel.

5. The lens barrel according to claim 3, wherein the communication unit receives the instruction based on the amount of the hand shake.

6. The lens barrel according to claim 5, wherein the drive unit drives the second barrel with respect to the first barrel based on the instruction received from the camera body by the communication unit.

7. The lens barrel according to claim 3, wherein the communication unit transmits information on the lens barrel to the camera body.

8. The lens barrel according to claim 7, wherein the information on the lens barrel is information on a barycenter of the lens barrel or information on a position in which the detection unit is provided.

9. The lens barrel according to claim 8, wherein when a focal length of the optical system is changed, the communication unit transmits the information on the barycenter of the lens barrel to the camera body.

10. A camera body with respect to which a lens barrel including an optical system can be attached and detached, the camera body comprising:
    a first housing which includes a first mount that can be attached to and detached from a first barrel of the lens barrel; and
    a second housing that (i) is arranged inside the first housing, (ii) includes a second mount that can be attached to and detached from a second barrel of the lens barrel, and (iii) includes an image capturing element,
    wherein the second housing is driven in a direction of rotation about an axis, which is different from an optical axis of the optical system, based on an amount of hand shake of a shooter holding at least one of the camera body and the lens barrel.

11. A camera system with respect to which a camera body and a lens barrel can be attached and detached,
    wherein the camera body includes:
       a first housing; and
       a second housing which includes an image capturing element, and
    the lens barrel includes:
       a first barrel which can be attached to and detached from the first housing;
       a second barrel which includes an optical system and which can be attached to and detached from the second housing;
       a detection unit configured to detect hand shake of a shooter holding at least one of the camera body and the lens barrel; and
       a drive unit that, based on an amount of the hand shake detected by the detection unit, drives the second housing and the second barrel with respect to the first housing or the first barrel.

* * * * *